United States Patent
Choi et al.

(10) Patent No.: US 6,616,497 B1
(45) Date of Patent: Sep. 9, 2003

(54) METHOD OF MANUFACTURING CARBON NANOTUBE FIELD EMITTER BY ELECTROPHORETIC DEPOSITION

(75) Inventors: Won-bong Choi, Suwon (KR); Hoon-young Kim, Seoul (KR); Deuk-seok Chung, Seoul (KR); Jung-ho Kang, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/603,201

(22) Filed: Jun. 26, 2000

(30) Foreign Application Priority Data

Aug. 12, 1999 (KR) .......................... 1999-33119

(51) Int. Cl.[7] .................................................. H01J 9/02
(52) U.S. Cl. ............................................ 445/24; 445/58
(58) Field of Search ..................................... 445/24, 58

(56) References Cited

U.S. PATENT DOCUMENTS

| | | | |
|---|---|---|---|
| 5,726,524 A | * | 3/1998 | Debe .......................... 313/309 |
| 5,872,422 A | * | 2/1999 | Xu et al. ..................... 313/495 |
| 6,217,843 B1 | * | 4/2001 | Homyonfer et al. ..... 252/501.1 |
| 6,440,761 B1 | * | 8/2002 | Choi ............................. 438/20 |
| 6,515,415 B1 | * | 2/2003 | Han et al. ................... 313/309 |

FOREIGN PATENT DOCUMENTS

| | | |
|---|---|---|
| EP | 0951047 | 10/1999 |
| EP | 0989579 | 3/2000 |
| KR | 1999030320 | 4/1999 |
| KR | 19990061353 | 7/1999 |

* cited by examiner

Primary Examiner—Kenneth J. Ramsey
(74) Attorney, Agent, or Firm—Lee & Sterba, P.C.

(57) ABSTRACT

A method of manufacturing a carbon nanotube field emitter for field emission displays by electrophoresis is disclosed. The method of manufacturing involves: first, loading an electrode plate and the field emitter substrate, which are spaced apart from one another, into an electrophoresis bath containing a carbon nanotube suspension for the electrophoresis; second, applying a predetermined bias voltage from a power supply between the electrode plate and the cathodes of the field emitter substrate to deposit, at room temperature, carbon nanotube particles on the surface of the electrodes exposed through the holes of the dielectric film; and third, drawing the field emitter substrate, on which the carbon nanotube particles have been deposited, out of the electrophoresis bath, and heating the field emitter substrate with carbon nanotube tips at a predetermined temperature. An efficient low-temperature process, incorporating low cost carbon nanotube particles, provides for a lower manufacturing cost.

8 Claims, 7 Drawing Sheets

METHOD OF MANUFACTURING CARBON NANOTUBE FIELD EMITTER BY ELECTROPHORETIC DEPOSITION

BACKGROUND OF THE INVENTION

1. Field of the Invention

The present invention relates to a method of manufacturing a field emitter for use in field emission displays. More specifically, the invention relates to a method of manufacturing a carbon nanotube field emitter on electrodes of a field emitter substrate by electrophoretic deposition.

2. Description of the Related Art

The use of field emitters as electron emitters for field emission displays is expected to increase dramatically in future generation flat displays. Field emitters emit electrons by creation of a strong electric field around the electrons. The current emission density of electrons is proportional to the intensity of the electric field produced around the field emitter, while the intensity of the electric field is influenced by the geometrical shape of the field emitter. Field emitters, which act as electron emitters for field emission displays, are usually formed in a cone shape with a sharp tip.

FIG. 1 is a sectional view of a conventional field emitter with a tip cone manufactured by a spindt technique. The spindt technique has been widely used. The conventional field emitter comprises a cathode 12 on a glass substrate 11, a sharp tip 15 for emitting electrons that is arranged on the cathode 12, a dielectric film 13 patterned to surround the tip 15, and a gate 14 formed on the dielectric film 13 with an opening 14a above the tip 15. The opening 14a allows for electron emission. In a field emission display, a plurality of cathodes is arranged in strips on a glass substrate.

A method of manufacturing a conventional field emitter for field emission displays, such as the type depicted in FIG. 1, by the spindt technique is set forth below.

FIGS. 2 through 6 are sectional views of successive stages of the method of manufacturing the conventional field emitter of FIG. 1. Referring now to FIG. 2, an electrode 12 is formed in a strip on the glass substrate 11, and followed by the formation of the dielectric film 13 and a gate layer 14'. Next, as depicted in FIG. 3, a photoresist mask 16 is formed by photolithography on the gate layer 14' and a gate 14 having an opening 14a. After removing the photoresist mask 16, the gate 14 is used as an etching mask to etch a hole 13a in the dielectric film 13.

Next, as shown in FIG. 5, after depositing a sacrificial layer 17 on the gate 14, the structure is spun to grow a tip 15 that has a high melting point material by electron beam deposition. Finally, the sacrificial layer 17 and a by-product layer 15a, which was deposited during the tip deposition, are removed by etching. This etching results in the field emitter as shown in FIG. 1.

The above-described method of manufacture results in several problems. For example, the lifetime of the tip in a field emitter such as that shown in FIG. 1 is shortened due to two factors: (1) ionized gases used for deposition and (2) presence of a non-uniform electric field distribution during operation. One possible alteration for this problem is to lower the driving voltage of a field emitter. This is accomplished by using a material having a low work function, such as molybdenum (Mo). This possible correction, however, does not fully solve the initial problem because the use of molybdenum as a material for the emitter tip does not provide a satisfactory lifetime of the tip as described above.

In an attempt to overcome this drawback, diamond and carbonic substances have been deposited to form emitter tips at high temperatures. This technique, however, when performed at high temperatures results in non-uniform coating properties of the product. Moreover, the use of diamond causes a problem in that a large area of the emitter cannot be coated.

SUMMARY OF THE INVENTION

In order to solve at least some of the aforementioned problems, it is a feature of the present invention to provide a method of manufacturing a carbon nanotube field emitter by electrophoretic deposition. In this method of manufacturing, emitter tips are formed of an ultra fine carbon nanotube having a low work function. This lowers a driving voltage of electrodes, and the electrophoresis deposition at low temperatures avoids deterioration by ionization of residual gases during operation. Accordingly, the life of the emitters is elongated.

This feature of the present invention is provided by a method of manufacturing a carbon nanotube field emitter by electrophoresis on a field emitter substrate. This feature is further provided by cathodes arranged in strips on a substrate, a dielectric film having holes over the cathodes, and metal gates having openings located over the holes of the dielectric film. The method of manufacturing involves: first, loading an electrode plate and the field emitter substrate, which are spaced apart from one another, into an electrophoresis bath containing a carbon nanotube suspension for the electrophoresis; second, applying a predetermined bias voltage from a power supply between the electrode plate and the cathodes of the field emitter substrate to deposit, at room temperature, carbon nanotube particles on the surface of the electrodes exposed through the holes of the dielectric film; and third, drawing the field emitter substrate, on which the carbon nanotube particles have been deposited, out of the electrophoresis bath, and heating the field emitter substrate with carbon nanotube tips at a predetermined temperature.

In a preferred embodiment, carbon nanotube particles having a length of 0.1 to 1 micrometer are screened by field-flow fractionation for preparation of the carbon nanotube suspension used in the first step. Further, the carbon nanotube suspension, used in the first step, contains a surfactant selected from the group consisting of Tritron X-100, AOT and nitrates consisting of $Mg(OH)_2$, $Al(OH)_3$ and $LA(OH)_3$. Additionally, the carbon nanotube suspension is sonicated during the electrophoresis. During the second step, it is preferable that the bias voltage, which is applied between the electrode plate and the cathodes of the field emitter substrate, is in the range of 1 to 1000 volts. In addition, it is preferable that the bias voltage is applied for a time period between 1 second and 10 minutes. Further, it is preferable that, during the second step, the carbon nanotube particles are deposited to a thickness of 0.01 to 0.5 micrometer. Finally, during the third step, it is preferable that the heating is performed at a temperature between 150° to 500° C.

BRIEF DESCRIPTION OF THE DRAWINGS

The above feature of the present invention, and the advantages corresponding thereto, will become more apparent by a detailed description of other preferred embodiments incorporating references to the attached drawings. In the drawings, like reference numerals are used to refer to like elements throughout.

DETAILED DESCRIPTION OF THE INVENTION

Korean patent application number 99-33119, filed on Aug. 12, 1999 and entitled: "Method for fabricating carbon nanotube field emitter by electrophoretic deposition" is incorporated in its entirety herein by reference.

Figure 7:
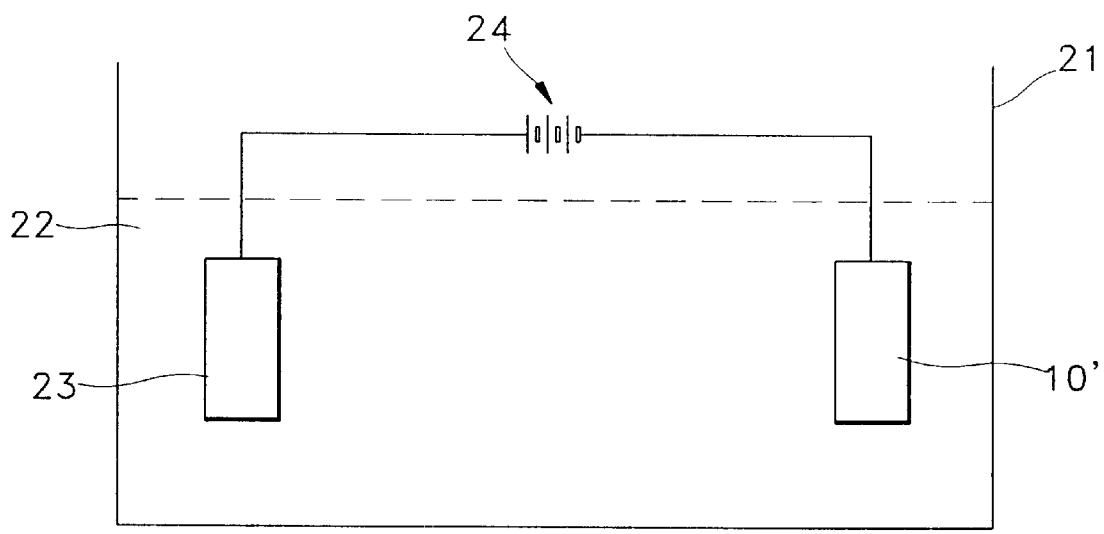
FIG. 7 illustrates an electrophoresis bath that is utilized to manufacture a carbon nanotube field emitter device according to the present invention.
Figure 10:
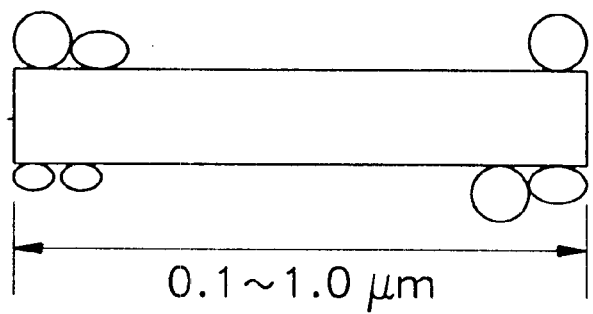
FIG. 10 illustrates a charged carbon nanotube particle that allows a suspension for electrophoresis.

Turning now to FIGS. 7 and 10, a method of manufacturing a carbon nanotube emitter device by electrophoresis according to the present invention will be described.

Figure 1:
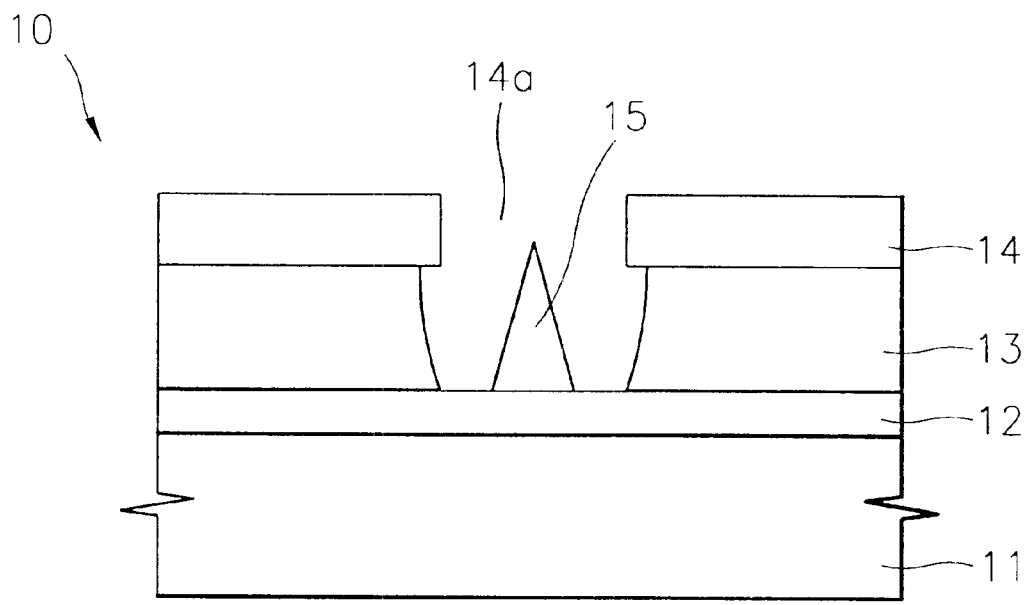
FIG. 1 is a sectional view of a conventional field emitter with a tip cone manufactured by a spindt technique.
Figure 2:
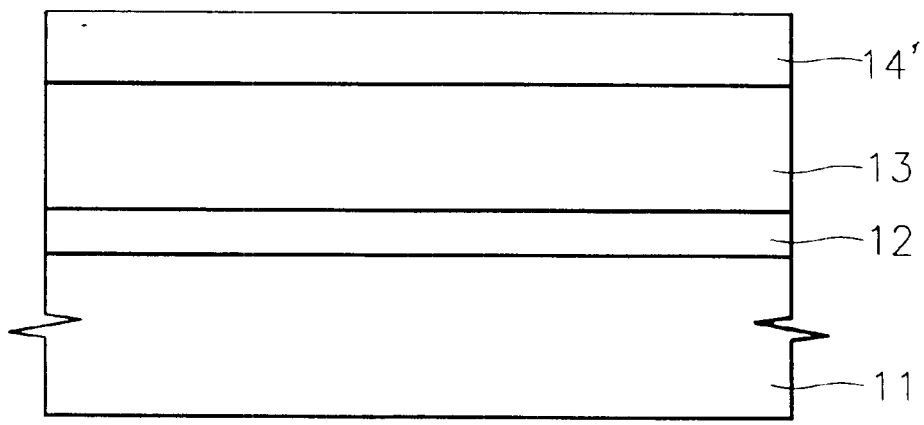
FIGS. 2 through 6 are sectional views of successive stages of a method of manufacturing the field emitter device in FIG. 1.
Figure 3:
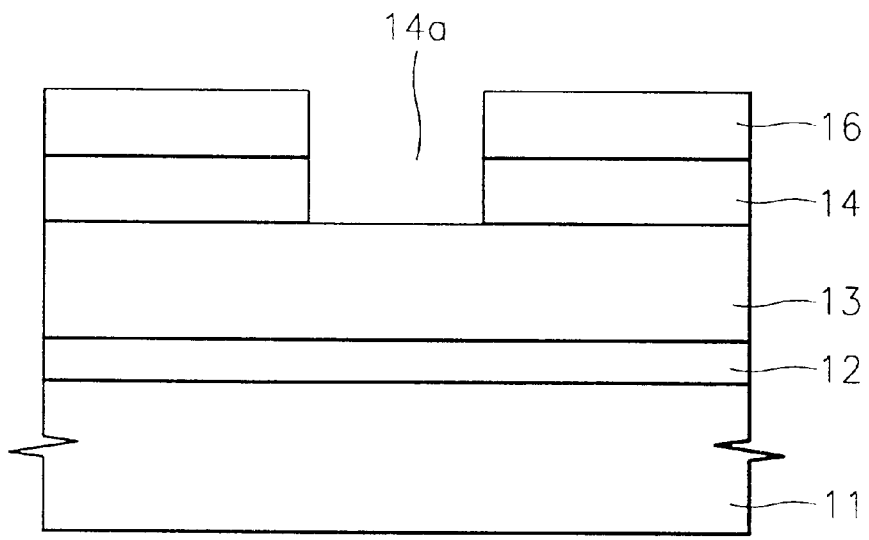
Figure 4:
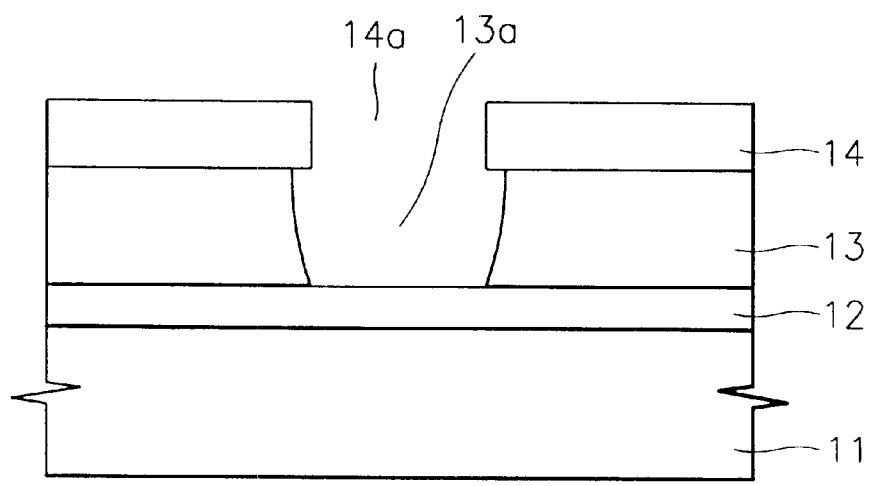
Figure 5:
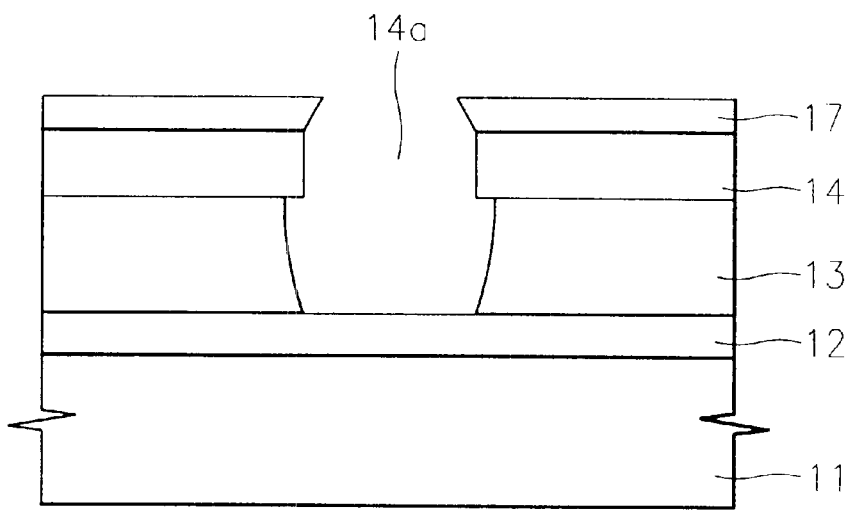
Figure 6:
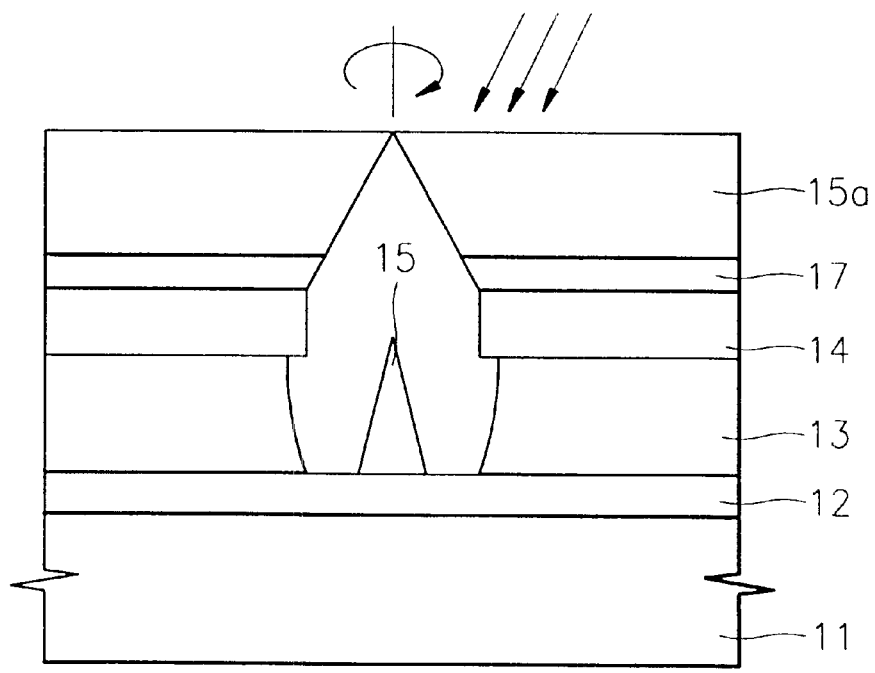

The field emitter substrate, as depicted in FIG. 4, referring to the structure immediately before formation of micro tips, is loaded into an electrophoresis bath 21, as shown in FIG. 7. In particular for the field emitter substrate 10', a plurality of cathodes 12 are arranged in strips on a glass substrate 11, and a dielectric film 13 is formed with holes 13a over the cathodes 12. Next, metal gates 14, having openings 14a located over the holes 13a of the dielectric film 13, are formed to expose the surface of the cathodes 12.

Then, carbon nanotubes are uniformly deposited onto the obtained field emitter substrate 10', and specifically onto the surface of the cathodes 12 exposed through the holes 13a, by electrophoretic deposition at room temperature. Electrophoretic deposition is set forth in greater detail below.

Initially, as shown in FIG. 7, the field emitter substrate 10' is loaded into the electrophoresis bath 21 containing a carbon nanotube suspension 22. An electrode plate 23 is also installed in the electrophoresis bath 21 and is spaced apart from the field emitter substrate 10'. A direct current ("DC") (or alternating current "AC") power supply 24 is installed outside of the electrophoresis bath 21. The cathode of the DC power supply 24 is connected to the cathodes 12 of the field emitter substrate 10'. The anode of the DC power supply 24 is connected to the electrode plate 23. Next, a bias voltage in the range of 1 to 1000 volts, supplied by the DC power supply 24, is applied between the electrode plate 23 and the cathodes 12 of the field emitter substrate 10'.

Figure 8:
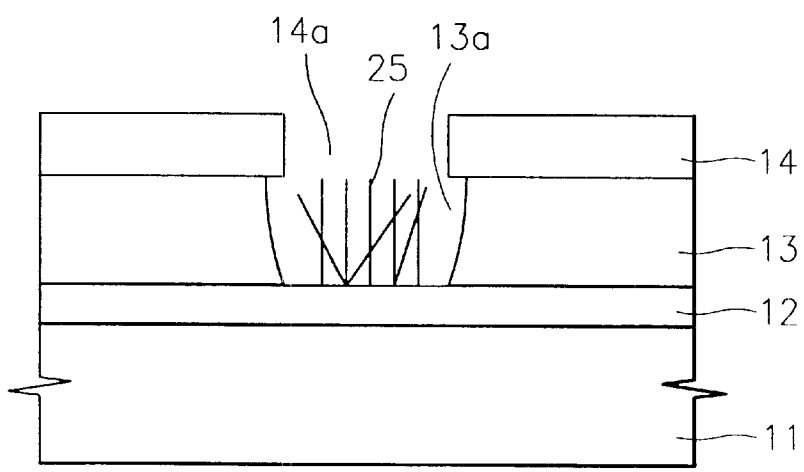
FIGS. 8 and 9 are sectional views illustrating methods of manufacturing a carbon nanotube field emitter by electrophoretic deposition according to the present invention.

Next, as a positive voltage from the DC power supply 24 is applied to the electrode plate 23, carbon nanotube particles charged by positive ions in the carbon nanotube suspension 22 migrate to and attach to the exposed cathodes 12 of the field emitter substrate 10'. This activity results in carbon nanotubes 25, as shown in FIG. 8.

Figure 9:
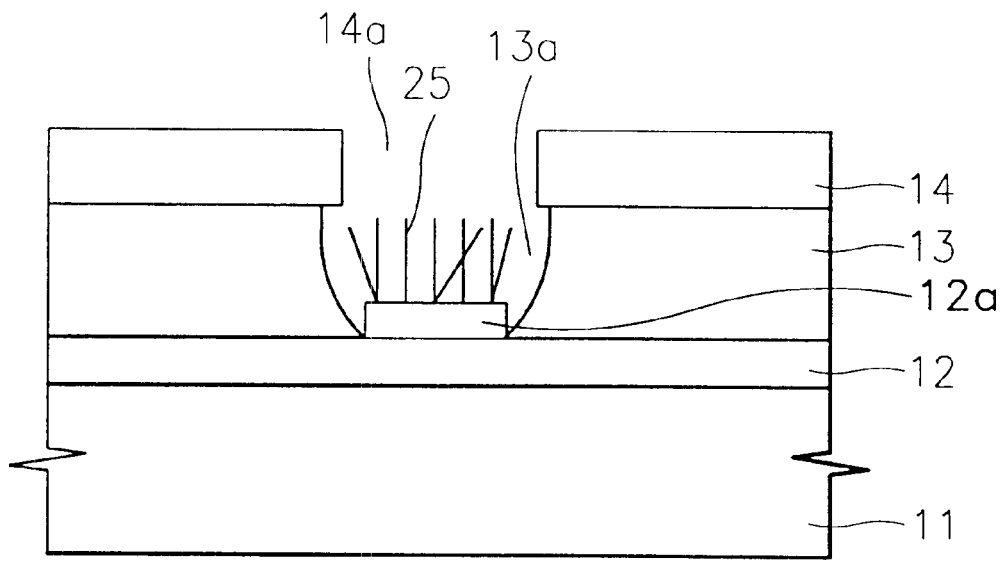

FIG. 9 illustrates another embodiment of the carbon nanotube emitter according to the present invention. In this alternative embodiment, a thin film 12a is deposited on the cathodes 12 of the field emitter substrate 10' and carbon nanotubes 25 are formed on the thin film 12a. In the alternative embodiment, the carbon nanotube particles are deposited in a similar manner as in the preferred embodiment illustrated in FIG. 8, and thus a detailed explanation thereof is not repeated.

The carbon nanotubes 25 for the field emitter according to the present invention may be prepared by an arc discharge or laser technique. The particles of the carbon nanotube have a length on the order of several tens of nanometers to several tens of micrometers. Additionally, the particles of carbon contain metal particles used as a catalyst and carbonic impurities. Prior to their use in preparation of a suspension for the electrophoresis, the carbon nanotube particles are reacted with a strong acid such as Nitric Acid ($HNO_3$) and Sulfuric Acid ($H_2SO_4$) to remove impurities therefrom, cut to appropriate lengths, and subjected to sedimentation and field-flow fractionation using a separator to screen carbon nanotube particles having a length of approximately 1 micrometers.

The carbon nanotube suspension contains a surfactant such as Tritron X-100, bis(1-ethylhexyl)sodium sulfosuccinate, commonly known as AOT, and nitrates of $Mg(OH)_2$, $Al(OH)_3$ or $La(OH_3)$. Further, the carbon nanbtube suspension is sonicated during the electrophoresis, during which carbon nanotube particles are charged with positive or negative charges as shown in FIG. 10. In this process, the intensity of the electric field and the amount of time for which the electric field is applied define the thickness of the carbon nanotube layer. A higher voltage level and a longer voltage application time will result in a thicker carbon nanotube layer.

For applications to a diode, an electric field having charges opposite to those on the surface of carbon nanotube particles is applied to an exposed electrode surface of a field emitter substrate for selective deposition of carbon nanotube particles thereon. Meanwhile, for applications to a triode having gates, which is illustrated in the embodiments of the present invention, a weak positive electric field is applied to the gates 14 while a positive electric field is applied to the electrodes 12 of the field emitter substrate 10'. This particular application avoids deposition of carbon nanotube particles on the gates 14. Specifically, as previously described, the electrode plate 23 is connected to the anode of the DC power supply 24 and the cathodes 12 of the field emitter substrate 10' are connected to the cathode of the DC power supply 24. As a positive potential is applied to the gates 14, the gates 14 repel positive ions in the carbon nanotube suspension 22 at the surface, while the exposed cathodes 12 of the field emitter substrate 10', which are connected to the cathode of the DC power supply 24, pull positive ions of the suspension through the holes 13a. As a result, the carbon nanotubes 25 are deposited only on the entire exposed surface of the cathodes 12, not on the gates 14 of the field emitter substrate 10'. At this time, carbon nanotube particles are almost vertically aligned near the openings 14a of the gates 14. This vertical alignment allows the carbon nanotube particles to migrate smoothly through the holes 13a to the cathodes 12, and thus the carbon nanotubes 25 can be deposited in order as shown in FIGS. 8 and 9.

After the deposition of carbon nanotube particles by electrophoresis, low-temperature heating is performed to sustain the deposition of the carbon nanotubes 25 on the cathodes 12 and ensure easy removal of impurities which are incorporated into the field emitter during the deposition. Accordingly, the field emitters shown in FIGS. 8 and 9, having carbon nanotubes 25 with a low work function, are completed.

Figure 11:
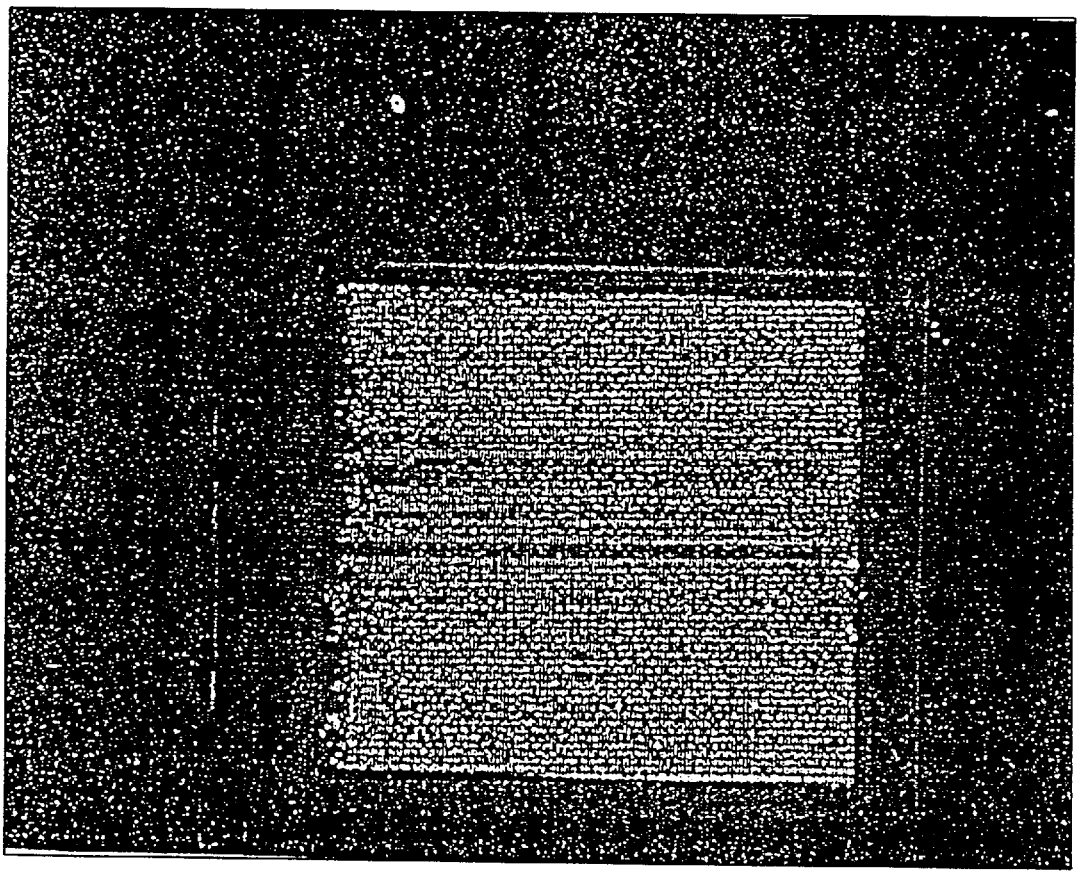
FIG. 11 illustrates an emission image of a field emission display adopting carbon nanotube field emitter arrays of the present invention.
Figure 12:
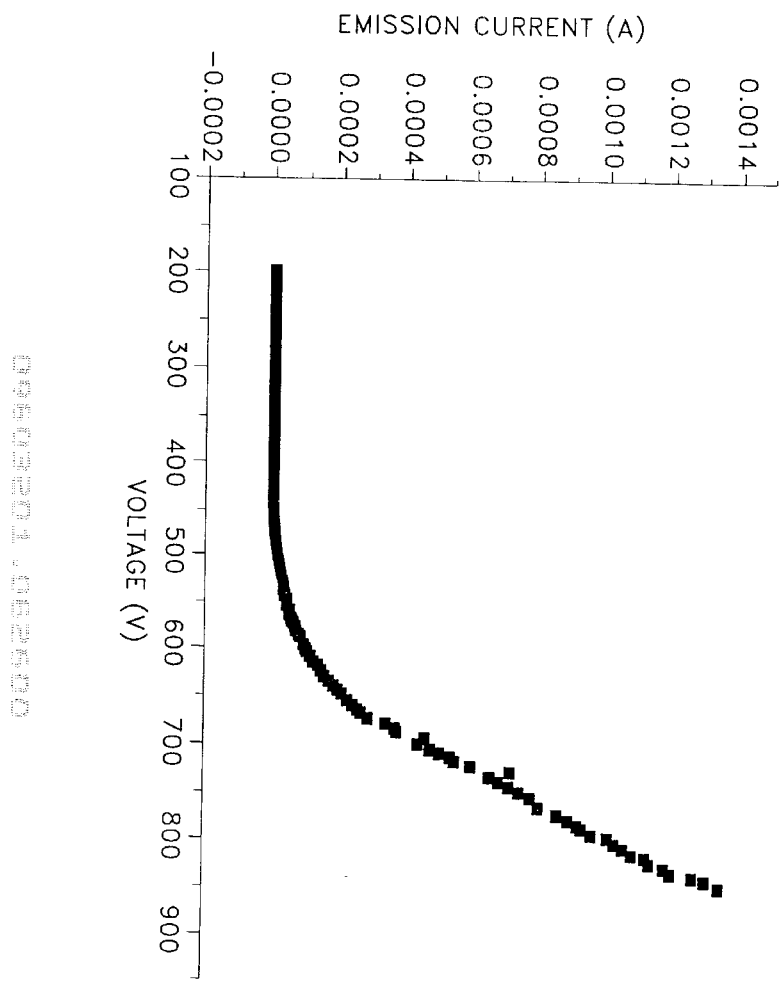
FIG. 12 is a graphical representation of the relationship between emission current (A) and voltage (V) ("an I-V curve") illustrating the field emission properties of the field emitter according to the present invention.

FIG. 11 illustrates an emission image of a field emission display adopting carbon nanotube field emitter arrays according to the present invention. FIG. 12 is an a graphical representation of the relationship between emission current (A) and voltage (V), also referred to as an I-V curve, illustrating the field emission properties of a field emitter according to the present invention.

A conventional field emitter has a very strong emission current density, so that its operational lifetime is shortened by ionization of residual gases within a vacuum area. However, by forming the field emitter tips with carbon nanotube particles by electrophoretic deposition, as in the present invention, the emission current density with respect to applied voltages may be maintained to be low, as shown in FIG. 12. This results in an enhanced durability by avoiding the ionization of residual gases, and in turn a longer lifetime of the field emitter.

As described above, the present invention provides a method of manufacturing a carbon nanotube field emitter by electrophoresis, which allows for a field emitter with a large area and a selective emitter deposition for a triode. Since the carbon nanotube particles have a low work function, the driving voltage of electrodes can be lowered. Additionally, the overall manufacturing process is performed at low temperatures, thereby reducing manufacturing cost and preventing ionization of residual gases, thus enhancing the durability of the field emitter.

While this invention has been particularly shown and described with reference to preferred embodiments thereof, those skilled in the art will recognize that various additions in form and details may be made without departing from the spirit and scope of the present invention.

What is claimed is:

1. A method of manufacturing a carbon nanotube field emitter by electrophoresis on a field emitter substrate including cathodes arranged in strips on a substrate, a dielectric film formed with holes over the cathodes, and metal gates formed with openings located over the holes of the dielectric film, on the dielectric film, the method comprising:

(a) loading an electrode plate and the field emitter substrate being spaced apart from one another into an electrophoresis bath containing a carbon nanotube suspension for the electrophoresis;

(b) applying a predetermined bias voltage from a power supply between the electrode plate and the cathodes of the field emitter substrate to deposit at room temperature carbon nanotube particles on the surface of the electrodes exposed through the holes of the dielectric film; and (c) drawing the field emitter substrate on which the carbon nanotube particles have been deposited, out of the electrophoresis bath, and heating the field emitter substrate with carbon nanotube tips at a predetermined temperature.

2. The method as claimed in claim 1, wherein carbon nanotube particles having a length in the range of 0.1 to 1 micrometer are screened by field-flow fractionation for preparation of the carbon nanotube suspension used in step (a).

3. The method as claimed in claim 1, wherein the carbon nanotube suspension of step (a) contains a surfactant selected from the group consisting of Tritron X-100, AOT and nitrates of $Mg(OH)_2$, $Al(OH)_3$ and $LA(OH)_3$.

4. The method as claimed in claim 3, wherein the carbon nanotube suspension of step (a) is sonicated during the electrophoresis.

5. The method as claimed in claim 1, wherein the bias voltage of step (b), applied between the electrode plate and the cathodes of the field emitter substrate, is in the range of 1 to 1000 volts.

6. The method as claimed in claim 5, wherein the bias voltage of step (b) is applied for a time period in the range of 1 second to 10 minutes.

7. The method as claimed in claim 1, wherein the carbon nanotube particles are deposited to a thickness of 0.01 to 0.5 micrometer during step (b).

8. The method as claimed in claim 1, wherein the heating of step (c) is performed at a temperature in the range of 150° to 500° C.

* * * * *